(12) United States Patent
Kramer

(10) Patent No.: US 7,485,997 B1
(45) Date of Patent: Feb. 3, 2009

(54) SYSTEM AND METHOD FOR SECURING A ROTOR TO A MOTOR DRIVE SHAFT USING CAM FASTENERS

(75) Inventor: Kenneth M. Kramer, Euclid, OH (US)

(73) Assignee: Avtron Industrial Automation, Inc., Independence, OH (US)

( * ) Notice: Subject to any disclaimer, the term of this patent is extended or adjusted under 35 U.S.C. 154(b) by 346 days.

(21) Appl. No.: 11/204,516

(22) Filed: Aug. 16, 2005

(51) Int. Cl.
 *H02K 1/06* (2006.01)
(52) U.S. Cl. .................................. 310/217; 310/261
(58) Field of Classification Search ............. 310/271, 310/217, 261
 See application file for complete search history.

(56) References Cited

U.S. PATENT DOCUMENTS

| | | | | |
|---|---|---|---|---|
| 4,934,042 A | * | 6/1990 | Bush | 29/598 |
| 5,718,421 A | * | 2/1998 | Cimino | 269/138 |
| 6,037,696 A | * | 3/2000 | Sromin et al. | 310/268 |

FOREIGN PATENT DOCUMENTS

| | | | |
|---|---|---|---|
| JP | 2004286155 A | * | 10/2004 |
| JP | 2006194083 A | * | 7/2006 |

* cited by examiner

*Primary Examiner*—Darren Schuberg
*Assistant Examiner*—Hong-Vinh Nguyen
(74) *Attorney, Agent, or Firm*—Thompson Hine LLP

(57) ABSTRACT

A rotor assembly for mounting a rotor to a motor shaft having a rotor with a centrally positioned central bore, the diameter of which is slightly larger than a diameter of the motor shaft, a first stepped bore intersecting the central bore and being aligned along a first axis of the rotor, and a second stepped bore also intersecting the central bore and being aligned along a second axis of the rotor. A first cam fastener is disposed within the first stepped bore, and a second cam fastener is disposed within the second stepped bore. Upon rotating the first and second cam fasteners, they engage the motor shaft thereby securely clamping the rotor to the motor shaft.

7 Claims, 2 Drawing Sheets

SYSTEM AND METHOD FOR SECURING A ROTOR TO A MOTOR DRIVE SHAFT USING CAM FASTENERS

BACKGROUND OF THE INVENTION

1. Technical Field

The present invention relates to rotors, and in particular, to a magnetic encoded rotor incorporating a means for securing the rotor to a motor drive shaft, the means incorporating one or more cam-type fasteners.

2. Related Art

There are various systems and methods for mounting modular magnetic encoder rotors to a motor drive shaft (or motor shaft). However, there are disadvantages with each of these current systems.

A first system is directed to a rotor having an external hub encircling and extending away from the central aperture. The external hub typically has a diameter less than the outer diameter of the rotor and extends from the face of the hub a relatively short distance. A plurality of set screws is inserted through holes in the hub to engage the motor shaft. Upon tightening, the set screws secure the rotor to the motor shaft. In this embodiment, the external hub is typically positioned external to a stator housing, allowing the rotor to be repositioned after the stator housing is fixed in place. However, a known advantage of a modular encoder is having a thin axial profile, which is defeated by having an external hub. An external hub on a rotor adds thickness to the overall rotor, thereby negating the principal advantage of the modular encoder.

The second method is similar to the first system wherein set screws are used to secure a rotor to the motor shaft. In this embodiment, the set screws are positioned within the working thickness of the rotor such that they engage and tighten against the motor shaft through holes extending from the side edge of the rotor through the rotor's entire thickness. This is possible because of the two tracks normally on the rotor, one of the tracks is typically a "marker" track which utilizes a small portion of the rotor's circumference so that the rest of the circumference on that side is available to locate the set screws. This allows the rotor to maintain its thin axial profile. However, there are several disadvantages with this rotor design. First, because the magnetic encoder rotor is located inside the stator housing, the side edge of the rotor is inaccessible after mounting the stator housing. A rotor cannot be repositioned, repaired, or replaced without removing the stator housing. Second, it is more difficult to reliably achieve maximum clamping force with set screw tightening tools.

The third method is a rotor that is mostly hollow, having an internal hub with integral spokes connecting the internal hub with the outer edge of the rotor. Typically two or three spokes connect the outer diameter to the inner diameter wherein the inner diameter matches the diameter of the motor shaft. One of the spokes has a slot in the center, which extends down through the inner diameter hub. This slot provides the extra space needed to fit the rotor on the motor shaft. A screw passes through the spoke with the slot such that upon tightening, the screw pinches the two halves of the slotted spoke together. This pinching action constricts the internal hub, tightening the rotor to the motor shaft. This system also has disadvantages. For example, it is more expensive to manufacture than using simple set screws. Further, the clamping forces are inferior to those of set screw methods. Lastly, the size of motor shaft diameters that can be accommodated are limited by the fact that the space between the slotted spoke and an adjacent spoke must be wide enough for a wrench or other tightening tool to fit.

A fourth system and method for mounting a rotor to a motor shaft is a rotor having a tapered hub and is divided into two halves. This system then uses a split ring to tighten the hub around a motor shaft. A first, or female, half of the rotor has an inner diameter matching the motor shaft with one side having a tapered groove to the hub defining the inner diameter. A second, or male, half of the rotor is machined with a groove having a taper inverse of the first half. The split ring is contained within the tapered groove of this second half. Then, as the two halves are bolted together with screws, the split ring contained within the halves constricts, thereby tightening the hub of the rotor around the motor shaft. As with other designs, this system for mounting rotor on a motor shaft is more expensive than a set screw system. Also, in the best case, this system has a clamping force comparable to set screw systems. However, this system is subject to assembly errors. If the clamping screws are not tightened uniformly (or if the screw over the split in the split ring) is tightened first, the clamping force is severely limited. There may be no immediate external indication of improper clamping, but such an improperly clamped rotor will slip during normal operation and cause system failures.

Therefore, there is a need for a simplistic system and method for securely mounting a rotor on a motor shaft. There is a further need for such a mounting system to provide easy and quick access to the fastening screws, or other fastening means, thereby minimizing maintenance time. There is still a further need for a mounting system for a rotor in which the rotor retains a thin profile while maintaining maximum clamping force on the motor shaft.

SUMMARY OF THE INVENTION

The present invention solves the problems associated with traditional mounting techniques by using cam fasteners, such as cam screws, to mount a rotor to a motor shaft. The principal advantage to using cam screws is that they provide clamping forces equal to those found in traditional set screw methods while providing immediate access to the screws for maintenance purposes or for repositioning the rotor on the motor shaft without removing the stator housing.

The cam screw rotor contains three pieces. The first is the rotor itself, which is a thin circular disk. The rotor has a central bore with a diameter approximately equal to the diameter of the motor shaft. Two holes are bored adjacent to the central bore such that each bore is adjacent to, and adjoining with, the central bore. Preferably each bore is aligned with a separate rotor axis. A conventional cam screw (having a head portion offset from a shaft portion) is screwed into each bore leaving the offset head portion clear of the central bore. After mounting the rotor on the motor shaft, the cam screws are rotated such that the eccentric heads contact the motor shaft with sufficient torque to prevent the rotor from slipping.

There are several advantages to this method. First, it is very simple. Manufacturing costs remain low in that the rotor itself has a very simple, straightforward design and conventional cam screws may be used. Second, the rotor can maintain a very narrow profile because the head portion of the cam screws may fit within a counter bore portion of the bores. Third, the cam screws for clamping the rotor to the rotor shaft are always accessible even after the stator housing is mounted. Fourth, for a given outer diameter, larger motor shaft sizes can be accommodated than those using the slotted spoke option. Fifth, this mounting system achieves clamping forces equal to or greater than that of set screw techniques, greater then those of the spoke style, and more consistent and less prone to failure than the split ring with tapered hub method.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 2:
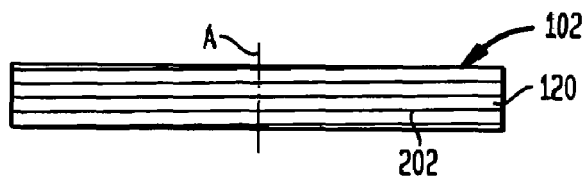
FIG. 2 is a planar top view of the rotor.
Figure 1:
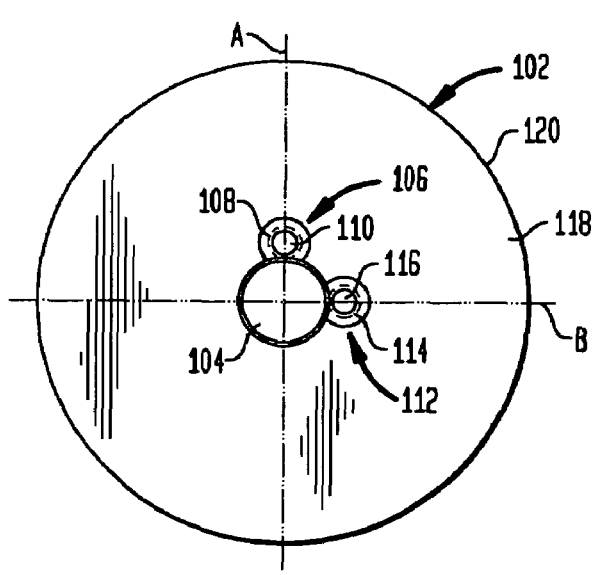
FIG. 1 is a planar front view of a rotor of the present invention.
Figure 3:
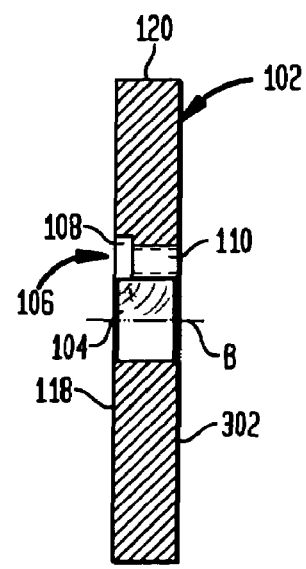
FIG. 3 is a planar cross-sectional side view of the rotor.

The rotor assembly of the present invention is shown in the accompanying figures. FIGS. 1-3 show the preferred embodiment of a rotor 102 having a central bore 104 positioned about the intersection of a first, vertical, axis A and a second, horizontal, axis B wherein the first axis A is perpendicular to the second axis B. This central bore 104 has a diameter slightly larger than the diameter of the motor shaft. The rotor 102 has a first stepped bore 106 consisting of a tapped hole 110 through the thickness of the rotor 102 and a counterbored hole 108. The tapped hole 110 and counterbored hole 108 are to accommodate the cam screw described below. The first stepped bore 106 is positioned adjacent to and adjoining with the central bore 104 aligned with the axis A such that the counterbored hole 108 intersects with the central bore 104.

In the preferred embodiment, about one quarter of the circumference of the counterbored hole 108 intersects with the central bore 104. In addition, the center point of the first stepped bore 106 preferably aligns with the first axis A, but this is for convenience purpose only. The first stepped bore 106 may be positioned anywhere on the central bore 104 to achieve the same clamping forces needed to securely mount the rotor 102 to a motor shaft.

The rotor 102 also has a second stepped bore 112 that is very similar to the first stepped bore 106. That is, the second stepped bore 112, preferably having a counterbored hole 114 and a tapped hole 116, passes through the thickness of the rotor 102 and is adjacent to and adjoining with the central bore 104 along a portion of its circumference. However, the center point of the second stepped bore 112 preferably aligns with the second axis B, but this is for convenience purpose only. The second stepped bore 112 may be positioned anywhere on the central bore 104 to achieve the same clamping forces needed to securely mount the rotor 102 to a motor shaft.

As with conventional rotors, the rotor 102 of the present invention has a first face 118 and a second face 302. In one embodiment, the rotor 102 is made of aluminum being about 3.7 inches in diameter and having a central bore 104 diameter of about 0.6255 inches in diameter, 0.441 inches thick, and a first stepped bore 106 and a second stepped bore 112 with a counterbored hole 108, 114 of about 0.375 inches in diameter and about 0.12 inches deep and a tapped hole 110, 116 of about 0.25 inches in diameter. In addition, the center point of the first stepped bore 106 and the second stepped bore 112 is about 0.458 inches in length from the center point of the central bore 104 (or the intersection of axis A and axis B). The edge of the central bore 104 on both the first face 118 and the second face 302 may optionally have a small taper to facilitate the positioning of the rotor 102 on a motor shaft. For example, such a taper may be 0.03 wide having a 45 degree angle.

The present invention is described in terms of a first stepped bore 106 and a second stepped bore 112 for convenience purpose only. It would be readily apparent to one of ordinary skill in the relevant art to use a different number of stepped bores in the manner described herein, along different axes of the rotor 102, to achieve the same clamping forces needed to securely mount the rotor 102 to a motor shaft.

Figure 4:
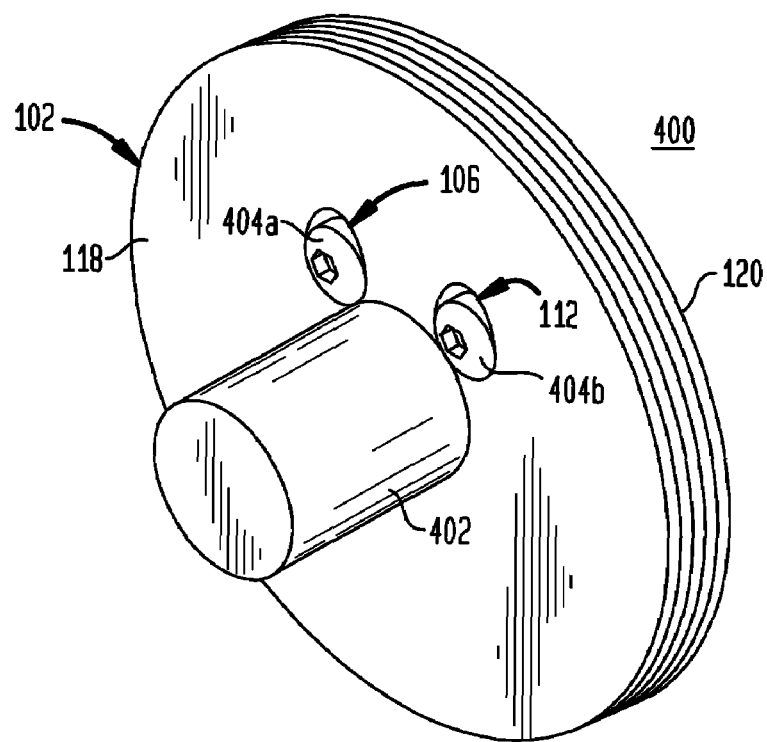
FIG. 4 is a perspective view of the rotor assembly of the present invention.
Figure 5:
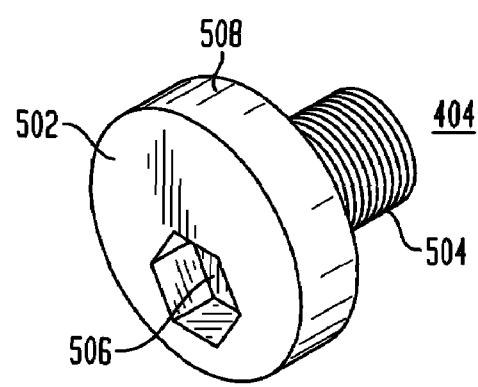
FIG. 5 is a perspective view of a cam fastener.

The rotor assembly 400 of the present invention of a rotor 102 mounted on a motor shaft 402 is shown in FIG. 4, whereas the preferred cam fasteners used for such mounting means are cam screws 404 shown in detail in FIG. 5. The preferred cam screw 404 used in the present invention is a conventional cam screw having a head portion 502 and a threaded shaft portion 504 wherein the head portion 502 is offset from the central longitudinal axis of the shaft portion 504. A socket 506 in the head portion 502 is used for tightening and loosening the cam screw 404. The preferred embodiment of cam fasteners are shown as cam screws 404 for convenience purpose only. The present invention can use any comparable cam fastener having an offset head.

Operationally, a cam screw 404 is inserted into each of the stepped bores 106, 112 of the rotor 102 and then backed off until the head portion 502 of each cam screw 404a,b has passed though the central bore 104 one time. The rotor 102 is positioned on the motor shaft 402 at a desired location. Once in position, each cam screw 404a,b is then rotated until the exterior edge 508 of each head portion 502 engages and is tightened against the motor shaft 402. The exterior edge 508 of a cam screw 404 contacts the motor shaft 402 due to the offset design of the head portion 502. Rotation of the cam screws 404a,b is stopped once the desired clamping force is achieved.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

I claim:

1. A rotor assembly for mounting a rotor to a motor shaft, comprising:

a rotor having a thickness, a central bore having a diameter larger than the shaft, a first axis passing through a center point of said central bore, and a second axis passing through said center point of said central bore wherein said first axis is approximately perpendicular to said second axis;

a first stepped bore having a center point, said first stepped bore being adjacent to and adjoining with said central bore such that said center point of said first stepped bore is aligned with said first axis;

a second stepped bore having a center point, said second stepped bore being adjacent to and adjoining with said central bore such that said center point of said second stepped bore is aligned with said second axis;

a first cam fastener having a length and adapted to fit within said first stepped bore; and a second cam fastener having a length and adapted to fit within said second stepped bore;

wherein said first cam fastener and said second cam fastener are rotated to clamp against the motor shaft.

2. The rotor assembly according to claim 1, wherein said first stepped bore and said second stepped bore each have a tapped hole and a counterbored hole.

3. The rotor assembly according to claim 1, wherein said first cam fastener and said second cam fastener is a cam screw.

4. A rotor assembly for mounting a rotor to a motor shaft, comprising:

a rotor having a thickness, a central bore having a diameter larger than the shaft, a first axis passing through a center point of said central bore, and a second axis passing through said center point of said central bore;

and a cam means for securing said rotor to the motor shaft.

5. The rotor assembly according to claim 4, wherein said cam means comprises a stepped bore in said rotor and a cam fastener, said stepped bore having a center point and being adjacent to and adjoining with said central bore, wherein said cam fastener is disposed within said stepped bore such that a head portion of said cam fastener engages and clamps against the motor shaft.

6. The rotor assembly according to claim 5, wherein said cam means comprises a second stepped bore in said rotor and a second cam fastener, said second stepped bore having a center point and being adjacent to and adjoining with said central bore, wherein said center point of said stepped bore is aligned with said first axis and said center point of said second stepped bore is aligned with said second axis, wherein said second cam fastener is disposed within said second stepped bore such that a head portion of said second cam fastener engages and clamps against the motor shaft.

7. The rotor assembly according to claim 6, wherein said first axis is approximately perpendicular to said second axis.

* * * * *